C. GRAF.
ANASTIGMATIC OBJECTIVE.
APPLICATION FILED DEC. 24, 1909.
981,412.
Patented Jan. 10, 1911.
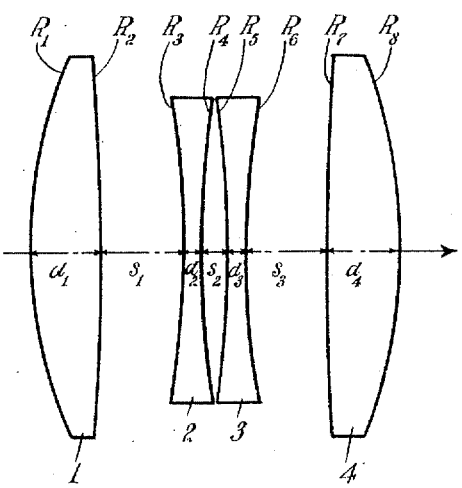
WITNESSES:
INVENTOR
Christopher Graf
BY
ATTORNEYS

UNITED STATES PATENT OFFICE.

CHRISTOPHER GRAF, OF NEW YORK, N. Y., ASSIGNOR OF ONE-EIGHTH TO FRANK H. EDMONDS, OF WASHINGTON, DISTRICT OF COLUMBIA.

ANASTIGMATIC OBJECTIVE.

981,412.  Specification of Letters Patent.  Patented Jan. 10, 1911.

Application filed December 24, 1909. Serial No. 534,814.

*To all whom it may concern:*

Be it known that I, CHRISTOPHER GRAF, a citizen of the United States, and a resident of the city of New York, Long Island City, borough of Queens, in the county of Queens and State of New York, have invented a new and Improved Anastigmatic Objective, of which the following is a full, clear, and exact description.

This invention relates to a compound lens to be used in photographic instruments or the like, and consists of a plurality of spaced lenses of substantially the same refractive index and having curvatures of such a character that the inner lenses are symmetrical with respect to each other, and the outer lenses unsymmetrical with respect to each other, thereby forming a compound lens, which, as a whole, is unsymmetrical.

This invention embodies not only a new construction but a new principle of construction, in that the three chief aberrations—the spherical aberration, coma and the astigmatism—are expressed as functions of the eight radii of curvature, thus making an exact algebraic solution for the radii necessary to bring these aberrations to zero. Such a solution would not be possible without first securing flatness of field by using glass all of the same index and gaining nearly all the focal power by separation.

An object of this invention is to provide an optical piece which can be easily manufactured and easily corrected, and which will have none of the defects, such as spherical and chromatic aberration, astigmatism, convexity of the image, coma, distortion or the like, and which will also take a picture with great sharpness and detail. This and further objects, together with the construction and combination of parts, will be more fully described hereinafter and particularly set forth in the claims.

Reference is to be had to the accompanying drawings forming a part of this specification, in which the figure represents a diagrammatic illustration of the lenses composing this optical piece and their relative positions, magnitudes, curvatures and thicknesses.

The line of sight passes from left to right, as indicated by the arrow in the figure. The optical piece is preferably composed of four lenses 1, 2, 3 and 4, spaced apart from each other so as to form positive meniscuses.

The radii and thicknesses of the various lenses and their distances apart are particularly set forth in the following table, in which R represents the radii, $d$ the thickness of the lens, and $s$ the thickness of the space between the lenses, the successive characteristics being individualized by sub-script numerals ascending from left to right.

| Radius of curvature in millimeters. | Glass constants. | Thicknesses of lenses and air-spaces in millimeters. |
|---|---|---|
| $R_1$ = 46.2<br>$R_2$ = 241.6 | Positive.<br>D=1.6110<br>G=1.6253 | $d_1$ 7.0<br>$s_1$ 8.0 |
| $R_3$ = 92.25<br>$R_4$ = 95.4 | Negative.<br>D=1.6095<br>G=1.6253 | $d_2$ 2.0<br>$s_2$ 2.4 |
| $R_5$ = 95.4<br>$R_6$ = 92.25 | Negative.<br>D=1.6095<br>G=1.6253 | $d_3$ 2.0<br>$s_3$ 8.0 |
| $R_7$ = 417.5<br>$R_8$ = 52.70 | Positive.<br>D=1.6110<br>G=1.6253 | $d_4$ 6.5 |

It is to be noted in the above table that the G-line for all of the lenses has the same refractive index, and inasmuch as this G-line is very important in photographic lenses, it is of vital interest to this case. The diameters of the lenses 1 and 4 are preferably 37 millimeters, and the diameters of the lenses 2 and 3 are preferably 30 millimeters.

The two outer lenses 1 and 4, which are similar but not identical and are preferably unsymmetrical with respect to each other, are positive or collecting lenses. Better corrections can thus be obtained, the cone of light entering the lens being of much smaller angle than that leaving in ordinary photography. No symmetrical lens can give images of very high quality. The lenses 2 and 3 are symmetrical with respect to each other, and are preferably negative or dispersing lenses; that is to say, these two middle lenses 2 and 3 are identical in curvature, glass and thickness but face in opposite directions.

It is to be noted that the separation of the first and second lenses 1 and 2 is 8.0 millimeters, the same as the separation of the third and fourth lenses 3 and 4, while the separation of the lenses 2 and 3 is 2.4 millimeters—just sufficient for the insertion of the stop.

The focal power of the combination is obtained almost entirely by separating the component lenses, that is, if the component lenses were shoved together the combination would have a focal length so great as to be useless. For example, in my lens of equivalent focal length 160, the focal lengths of the components are respectively +62, —75, —75 and +75. The separations are 8, 2.4 and 8. If the lenses were shoved together the equivalent focal length would be 356. The purpose of these first two principles of construction is to secure a flat image field without restricting the curvatures of the lens surfaces, leaving these free to take care of the five remaining aberrations.

There is thus formed an optical piece with the first and last lenses positive and unsymmetrical, and the second and third lenses negative and symmetrical, and all the four component lenses of which are made of glass of the same index of refraction, 1.6253, and in which the three chief aberrations—spherical aberration, coma and astigmatism, are functions of the eight radii of curvature.

While I have shown one embodiment of my invention, I do not wish to be limited to the specific details thereof, but desire to be protected in various changes and modifications which I may make within the scope of the appended claims.

Having thus described my invention, I claim as new and desire to secure by Letters Patent:

1. An anastigmatic objective, consisting of two positive and two negative lenses separated by air spaces, the negative lenses being symmetrical and symmetrically arranged between the positive lenses, and the positive lenses being of different thicknesses and having different radii of curvature and spaced from the negative lenses a distance greater than the negative lenses are spaced apart, said positive lenses being arranged with the faces having the shorter radii of curvature on the outer side, and all of the said lenses having the same index of refraction for the principal color.

2. An anastigmatic objective comprising four lenses with adjacent lenses air spaced from each other and including two positive and two negative lenses with the negative lenses adjacent each other and the positive lenses on the outer side of the two negative lenses, said lenses having the same index of refraction for the principal color, one of the positive lenses having faces whose radii of curvature are approximately 46.2 and 241.6 and the other positive lenses having faces whose radii of curvature are approximately 417.5 and 52.70 and the radii of curvature of the negative lenses being approximately 92.25 and 95.4, all substantially as set forth.

3. An anastigmatic objective, comprising a positive lens having faces whose radii of curvature are 46.2 and 241.6, a negative lens spaced apart from said positive lens by an air space and having faces whose radii of curvature are 92.25 and 95.4, a negative lens spaced apart from said first-mentioned negative lens by an air space and having faces whose radii of curvature are 95.4 and 92.25, and a positive lens spaced apart from said last-mentioned negative lens by an air space and having faces whose radii of curvature are 417.5 and 52.70, all of said lenses having the same refractive index.

In testimony whereof I have signed my name to this specification in the presence of two subscribing witnesses.

CHRISTOPHER GRAF.

Witnesses:
HORATIO WHITING,
PHILIP D. ROLLHAUS.